(No Model.)
M. D'AMILLY & J. CAILLET.
HORSESHOE.
No. 468,130. Patented Feb. 2, 1892.
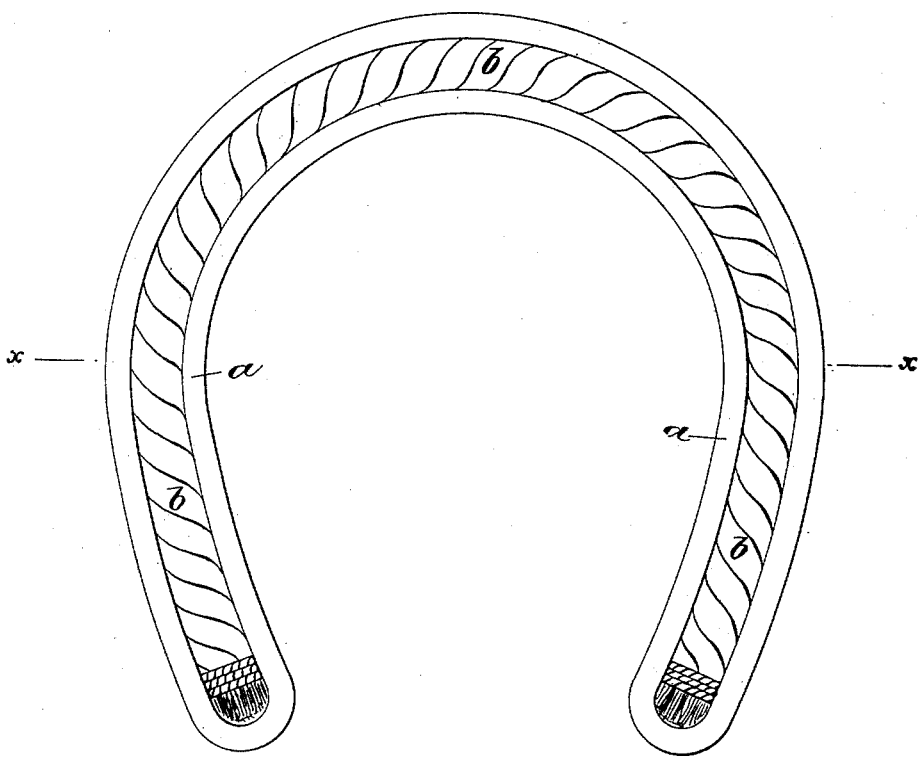
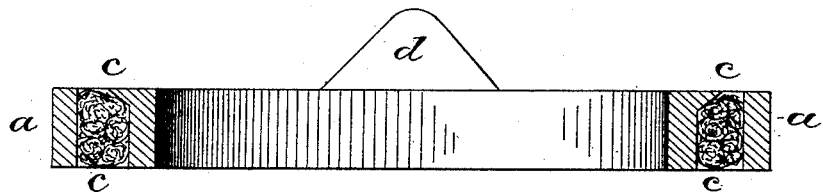
Witnesses:
O. H. Benjamin.
David Walter Brown,
Inventors,
Justin Caillet
Count Maurice d'Amilly
By William Say
their Attorney.

UNITED STATES PATENT OFFICE.

MAURICE D'AMILLY AND JUSTIN CAILLET, OF PARIS, FRANCE, ASSIGNORS TO WILLIAM GEORGE TIFFANY, OF BALTIMORE, MARYLAND.

HORSESHOE.

SPECIFICATION forming part of Letters Patent No. 468,130, dated February 2, 1892.

Application filed November 11, 1890. Serial No. 371,112. (No model.) Patented in France May 31, 1890, No. 206,024.

*To all whom it may concern:*

Be it known that we, MAURICE D'AMILLY and JUSTIN CAILLET, citizens of France, residing at Paris, France, have invented certain new and useful Improvements in Horseshoes, of which the following is a specification, reference being had to the accompanying drawings, forming part of the same.

Our invention (for which we hold French Patent No. 206,024, dated May 31, 1890) relates to a certain new and useful improvement in horseshoes; and it consists in the novel construction and arrangement of parts thereof, hereinafter fully described and claimed, resulting in a horseshoe of light weight and having a rough surface of soft material to prevent slipping.

Our invention is illustrated in the accompanying drawings, in which—

Figure 1 is a plan view of the under surface of the shoe, and Fig. 2 a cross-section of the same.

*a* is the body of the horseshoe, consisting of an endless iron ring having therein a continuous slot. Said body is of metal, compressed wood, compressed paper, or the like. One or both inner walls of the slot of said shoe slope toward each other, forming a downwardly-diverging slot *c*, as in Fig. 2—that is to say, a slot open at the top and open at the bottom, but wider at the bottom than at the top. The smallest width of this slot lies in use next the hoof of the horse, while the greater width of the slot is upon that surface of the shoe which is brought in contact with the pavement or road. Into this groove *c* is packed a filling of soft material, preferably twisted hemp rope *b*, which may have its ends tied by waxed strings or in any suitable manner.

In operation the shoe is placed against the hoof with the smallest width of the slot next the hoof. Fastening-nails are driven through the rope or analogous soft filling *b* into the hoof, thereby securing the entire structure to the hoof by an elastic band of filling material. In use the surface of the soft filling next the road or pavement takes up pieces of stone, dirt, &c., becoming hardened or macadamized, and hence presenting a rough surface to the road, while preserving the elasticity to the hoof. Slipping is thereby avoided and also wrenching on the hoof of the animal.

A pincher or toe-piece *d* may be used to give greater security to the shoe.

We force our rope into the slot *c* either by hand, hammer, vise, or press.

What we claim, and desire to secure by Letters Patent, is—

The horseshoe-body *a*, made with the downwardly-diverging slot *c* and combined with the soft filling *b*, which fills and extends through said slot at top and bottom, all arranged so that the nails must be passed through said soft filling to secure the shoe to the hoof, as specified.

Paris, France, September 30, 1890.

MAURICE D'AMILLY.
        J. CAILLET.

Witnesses:
  HENRY C. HALL,
  CLYDE SHROPSHIRE,
        *Both of* 19 *Rue Scribe, Paris.*